(12) United States Patent
Chen et al.

(10) Patent No.: US 11,243,046 B2
(45) Date of Patent: Feb. 8, 2022

(54) TELESCOPIC BATON

(71) Applicant: Nextorch Industries Co., Ltd., Guangdong (CN)

(72) Inventors: Junping Chen, Guangdong (CN); Yongzhi Huang, Guangdong (CN); Bing Liang, Guangdong (CN)

(73) Assignee: Nextorch Industries Co., Ltd., Guangdong (CN)

( * ) Notice: Subject to any disclaimer, the term of this patent is extended or adjusted under 35 U.S.C. 154(b) by 316 days.

(21) Appl. No.: 16/338,707

(22) PCT Filed: Nov. 8, 2017

(86) PCT No.: PCT/CN2017/109901
§ 371 (c)(1),
(2) Date: Apr. 2, 2019

(87) PCT Pub. No.: WO2018/218873
PCT Pub. Date: Dec. 6, 2018

(65) Prior Publication Data
US 2021/0278166 A1    Sep. 9, 2021

(30) Foreign Application Priority Data
Jun. 2, 2017 (CN) .......................... 201720639891.4

(51) Int. Cl.
*F41B 15/02* (2006.01)
*F16B 7/10* (2006.01)

(52) U.S. Cl.
CPC ............ *F41B 15/027* (2013.01); *F16B 7/105* (2013.01)

(58) Field of Classification Search
CPC ............................. F41B 15/027; F16B 7/105
See application file for complete search history.

(56) References Cited

U.S. PATENT DOCUMENTS

| 1,947 A | 1/1841 | Conklin |
|---|---|---|
| 3,259,407 A | 7/1966 | Welt |

(Continued)

FOREIGN PATENT DOCUMENTS

| CN | 201335063 Y | 10/2009 |
|---|---|---|
| CN | 202747923 U | 2/2013 |

(Continued)

OTHER PUBLICATIONS

Extended European Search Report for corresponding EP patent application No. 17911838.5, dated Oct. 18, 2019.

*Primary Examiner* — William M Pierce
(74) *Attorney, Agent, or Firm* — Yu Gang

(57) ABSTRACT

A telescopic baton is provided. The telescopic baton comprises a plurality of tubes sequentially arranged in an embedded manner, wherein a tube on an inner side of two adjacent tubes in the plurality of tubes is capable of extending and withdrawing along an axis direction of a tube on an outer side of the two adjacent tubes, a locking groove is formed in an inner wall of a first end of the tube on the outer side; a blade cam locking assembly, which comprises a socket sleeve, a plurality of blade cam blocks, a torsional spring and a fixing mechanism, wherein both extended ends of the torsional spring are respectively abutted against the socket sleeve and the blade cam block; an unlocking structure, which is mounted inside a tube on an outermost side of the plurality of tubes, and is used for unlocking the blade cam locking assembly.

16 Claims, 6 Drawing Sheets

(56) References Cited

U.S. PATENT DOCUMENTS

| | | | |
|---|---|---|---|
| 11,067,359 B1* | 7/2021 | Chiang | F41B 15/027 |
| 2013/0150167 A1* | 6/2013 | Pelkey | F41B 15/027 |
| | | | 463/47.7 |
| 2014/0256452 A1 | 9/2014 | Cheng | |
| 2015/0038240 A1* | 2/2015 | Parsons | F41B 15/027 |
| | | | 463/47.7 |
| 2016/0032951 A1* | 2/2016 | Pahwa | F16B 7/105 |
| | | | 403/377 |
| 2016/0169616 A1* | 6/2016 | Cheng | F41B 15/00 |
| | | | 463/47.7 |
| 2020/0158462 A1* | 5/2020 | Kupa | F41B 15/027 |
| 2021/0199402 A1* | 7/2021 | Parsons | F41B 15/027 |
| 2021/0270562 A1* | 9/2021 | Liang | F41B 15/027 |
| 2021/0278166 A1* | 9/2021 | Chen | F41B 15/027 |
| 2021/0310764 A1* | 10/2021 | Hultman | F41B 15/027 |

FOREIGN PATENT DOCUMENTS

| | | |
|---|---|---|
| CN | 204027431 U | 12/2014 |
| CN | 104964603 A | 10/2015 |
| CN | 105865259 A | 8/2016 |
| CN | 107560497 A | 1/2018 |
| JP | 7-4893 A | 1/1995 |
| JP | 2016-17592 A | 2/2016 |
| TW | 201510467 A | 3/2015 |

* cited by examiner

TELESCOPIC BATON

TECHNICAL FIELD

The disclosure relates to a technical field of police appliances, and in particular to a telescopic baton.

BACKGROUND

A baton body of a telescopic baton is composed of a plurality of sections of tubes. Tubes of a related telescopic baton are respectively connected with two springs, and a magnet is arranged at a rear end of a handle to fix the baton body, During using, the handle is pressed to release the springs, and then the baton body extends out under an action of the springs. When not using, the baton body may be withdrawn by slightly knocking the baton body with a hard article with the head of the baton body facing downwards. The baton is flexible and convenient to use and easy to carry.

However, the related telescopic baton, when being extended out, may be withdrawn once under resistance, which is poor in stability. In addition, it is not smooth to operate in the extension process, and is inconvenient to unlock.

SUMMARY

Some embodiments of the disclosure provide a telescopic baton so as to solve the problems that, the telescopic baton of the related art is poor in stability and inconvenient to unlock.

In an exemplary embodiment, the disclosure provides a telescopic baton which includes a plurality of tubes sequentially arranged in an embedded manner, a tube on an inner side of two adjacent tubes in the plurality of tubes is capable of extending and withdrawing along an axis direction of a tube on an outer side of the two adjacent tubes, and a locking, groove is formed in an inner wall of a first end of the tube on the outer side; a blade cam locking assembly, which includes a socket sleeve, a plurality of blade cam blocks, a torsional spring and a fixing mechanism, the socket sleeve is fixedly coupled to a first end of the tube on the inner side; the plurality of blade cam blocks are arranged on the socket sleeve in a same circumferential direction, both extended ends of the torsional spring are respectively abutted against the socket sleeve and the plurality of blade cam blocks so as to enable the plurality of blade cam blocks to extend in a direction far away from a central axis of the socket sleeve, when the first end of the tube on the inner side extends to the first end of the tube on the outer side, the plurality of blade cam blocks may be automatically clamped inside the locking groove under an action of the torsional spring; an unlocking structure, which is fixedly mounted inside the tube on an outermost side of the plurality of tubes, and the unlocking structure is used for driving the plurality of blade cam blocks to withdraw in a direction close to the central axis of the socket sleeve under an action of an external force so as to unlock the blade cam locking assembly.

In an exemplary embodiment, the fixing mechanism includes: a positioning plate, which is mounted on a side, far away from the socket sleeve, of the plurality of blade cam blocks; and a screw shaft, which penetrates through the positioning plate and a corresponding blade cam block in the plurality of blade cam blocks and is connected with the socket sleeve.

In an exemplary embodiment, the blade cam locking assembly further includes a lubricating piece, and the lubricating piece is mounted between the blade cam block and the positioning plate.

In an exemplary embodiment, the telescopic baton includes an annular iron ring arranged inside the locking groove.

In an exemplary embodiment, a first positioning hole is formed in the socket sleeve, a second positioning hole corresponding to the first positioning hole is formed in each of the plurality of blade cam blocks, the torsional spring is sleeved on the screw shaft, and both ends of the torsional spring is respectively located inside the first positioning hole and the second positioning hole.

In an exemplary embodiment, a stud section is arranged on the socket sleeve, and a threaded hole is formed in the first end of the tube on the inner side.

In an exemplary embodiment, there are three blade cam blocks, cam parts of the three blade cam blocks are located in a middle of the socket sleeve, and the unlocking structure shifts the cam parts to enable the three blade cam blocks to withdraw in the direction close to the central axis of the socket sleeve so as to unlock the blade cam locking assembly.

In an exemplary embodiment, the unlocking structure is a thimble, an avoidance hole is formed in the blade cam locking assembly, and the thimble penetrates through the avoidance hole to drive the three blade cam blocks to withdraw in the direction close to the central, axis of the socket sleeve.

In an exemplary embodiment, a switch button for driving the unlocking structure to move is arranged at an end part of the tube on the outermost side of the plurality of tubes.

By adopting the technical scheme of the disclosure, due to arrangement of the blade cam locking assembly and the unlocking structure of the telescopic baton, the tube on the inner side of the telescopic baton may be conveniently locked at the first end of the tube on the outer side, so that the extension state of the telescopic baton may be maintained; when the telescopic baton needs to be extended and withdrawn, the tube on the inner side may be withdrawn into the tube on the outer side only by unlocking the blade cam locking assembly through the unlocking structure, and the telescopic baton is simple and rapid to operate, good in stability and convenient for the police to use.

BRIEF DESCRIPTION OF THE DRAWINGS

The drawings of the description, forming a part of the present application, are intended to provide a further understanding for the disclosure. The schematic embodiments and illustrations of the disclosure are intended to explain the disclosure, and do not form improper limits to the disclosure. In the drawings.

Figure 1:
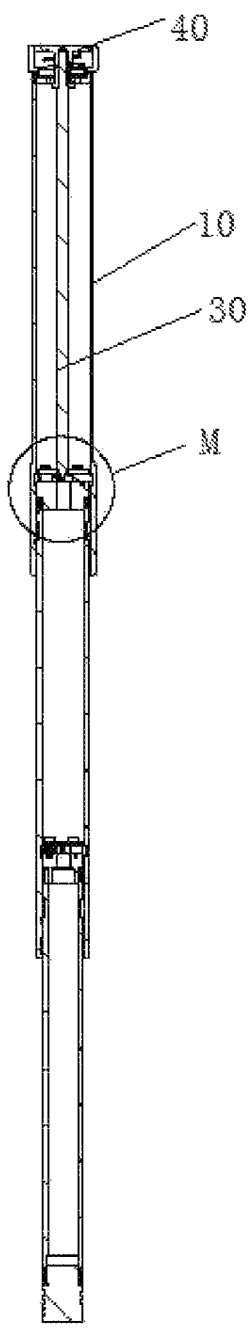
FIG. 1 schematically shows a section view of a telescopic baton of the disclosure.
Figure 2:
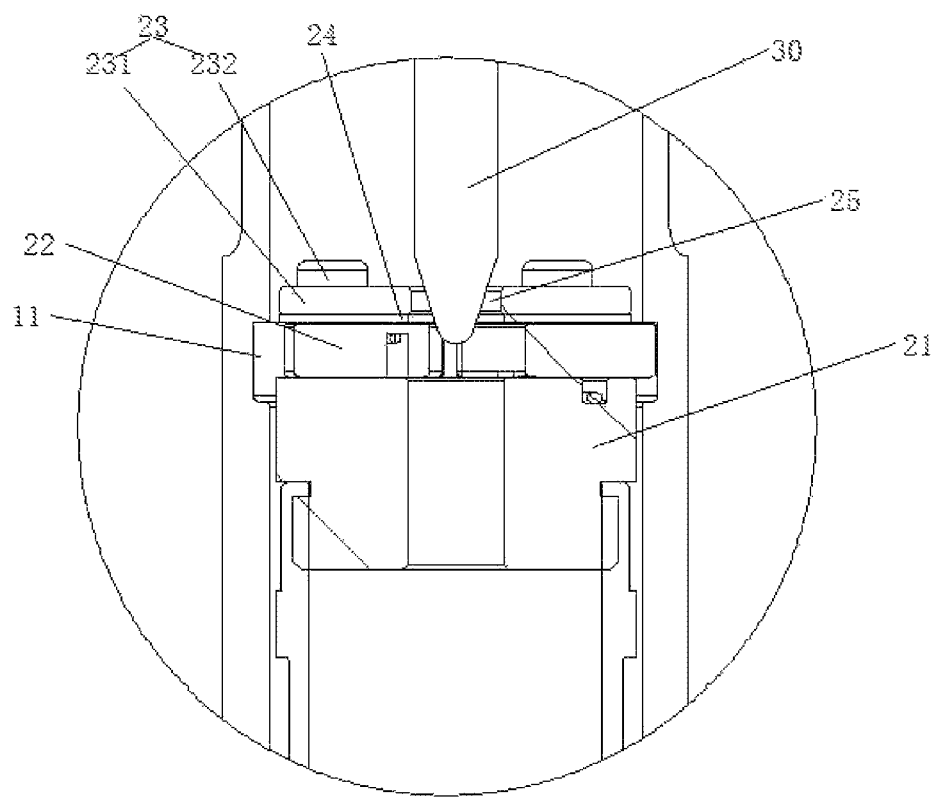
FIG. 2 schematically shows an enlarged drawing of an area M in FIG. 1.

The foregoing drawings include the following drawing marks:

10: tube; 11: locking groove; 20: blade cam locking assembly; 21: socket sleeve; 211: first positioning hole; 212: stud section; 22, blade cam block; 221: second positioning hole; 23: fixing mechanism; 231: positioning plate; 232: screw shaft; 24: lubricating piece; 25: avoidance hole; 26: torsional spring; 30: unlocking structure; 40: switch button.

DETAILED DESCRIPTION OF THE EMBODIMENTS

It is to be understood that embodiments in the present application and features in the embodiments may be combined mutually under the condition of no conflicts. The disclosure will be illustrated hereinbelow with reference to the drawings and in conjunction with the embodiments in detail.

It is to be noted that terms used herein only aim to describe a specific implementation mode and are not intended to limit an exemplar implementation mode of the present application. For example, unless otherwise directed by the context, singular forms of terms used herein are also intended to include plural forms. Besides, it will be also appreciated that when terms 'contain' and/or 'include' are used in the present description, it is pointed out that features, steps, operations, devices, assemblies and/or a combination thereof exist.

It is to be noted that the description and claims of the application and terms 'first', 'second', etc. in the foregoing drawings are used for distinguishing similar objects rather than describing a specific sequence or a precedence order. It will be appreciated that the terms used in such a way may be exchanged under appropriate conditions, in order that the implementation mode of the application described here can be implemented in a sequence other than sequences graphically shown or described here. In addition, terms 'include' and 'have' and any inflexions thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

For ease of description, spatial relative terms such as 'over', 'above', 'on an upper surface' and 'upper' may be used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as 'above other devices or structures' or 'over other devices or structures' will be located as 'below other devices or structures' or 'under other devices or structures'. Thus, an exemplary term 'above' may include two orientations namely 'above' and 'below'. The device may be located in other different modes (rotated by 90 degrees or located in other orientations), and spatial relative descriptions used herein are correspondingly explained.

As shown in FIG. 1 to FIG. 8, according to one embodiment of the disclosure, a telescopic baton is provided, which includes a plurality of tubes 10, a blade cam locking assembly 20 and an unlocking structure 30.

The plurality of tubes 10 are sequentially arranged in an embedded manner, a tube 10 on an inner side of two adjacent tubes 10 in the plurality of tubes 10 is capable of extending and withdrawing along an axis direction of a tube 10 on an outer side, a locking groove 11 is formed in an inner wall of a first end of the tube 10 on the outer side; the blade cam locking assembly 20 is fixedly mounted at a first end of the tube on the inner side of adjacent tubes 10, when the first end of the tube 10 on the inner side extends out to a first end of the tube on the outer side, the blade cam locking assembly 20 is automatically clamped inside the locking groove 11, thus the tube 10 on the inner side is locked at the first end of the tube 10 on the outer side; the unlocking structure 30 is fixedly mounted inside the tube 10 on the outermost side of the plurality of tubes 10; under action of external forces, the unlocking structure 30 drives the plurality of blade cam blocks 22 to withdraw in a direction close to a central axis of the socket sleeve 21 so as to unlock the blade cam locking assembly 20, after the blade cam locking assembly 20 is unlocked through the unlocking structure 30, the tube 10 on the inner side is capable of freely moving in axis direction of the tube 10 on the outer side, and at the moment, the tube 10 on the inner side may be withdrawn into the tube 10 on the outer side only by exerting a force to the tube 10 on the inner side.

From the above structure it may be known that in an exemplary embodiment, due to arrangement of the blade cam locking assembly 20 and the unlocking structure 30, the tube 10 on the inner side of the telescopic baton may be locked at the first end of the tube 10 on the outer side, and the telescopic baton is kept at an extended state. When the telescopic baton needs to be withdrawn, the tube on the inner side may be withdrawn into the tube on the outer side only by unlocking the blade cam locking assembly 20 through the unlocking structure 30, and the telescopic baton is simple and rapid to operate, good in stability and convenient for the police to use.

Figure 3:
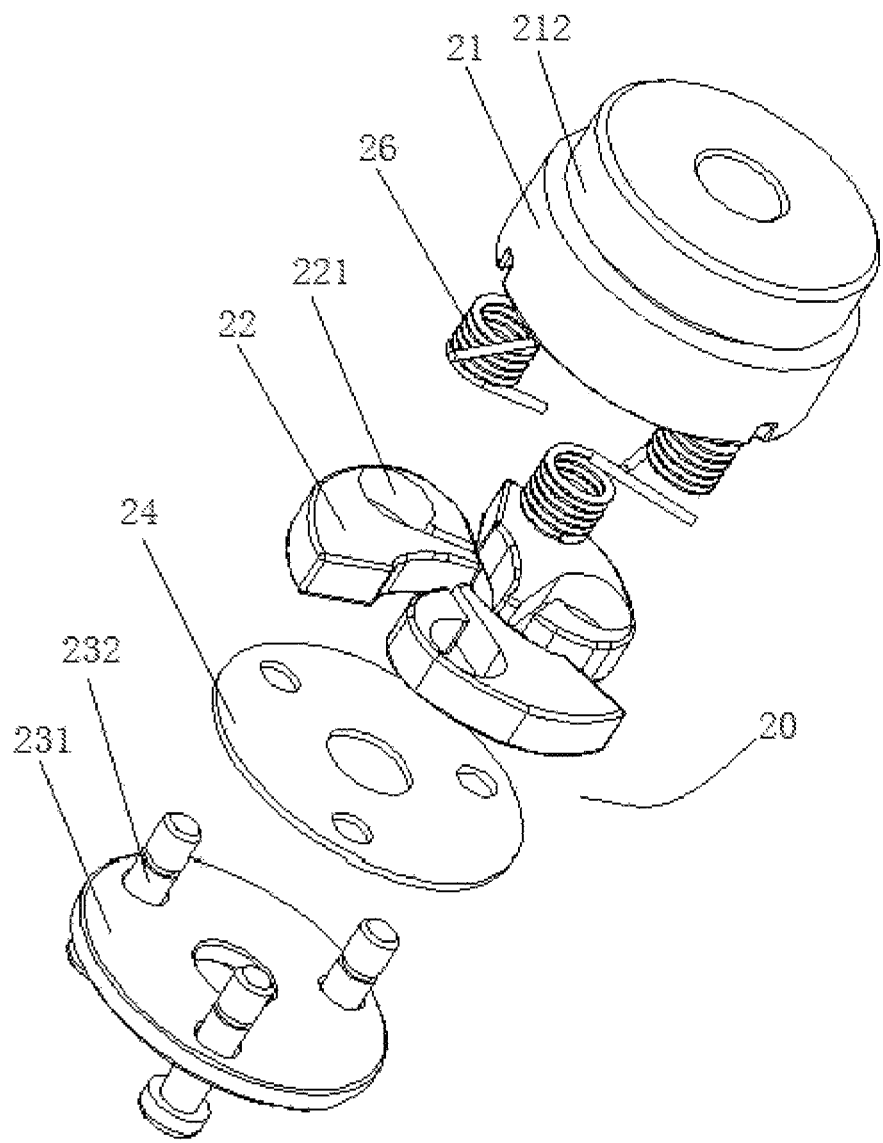
FIG. 3 schematically shows a first exploded view of a blade cam locking assembly of the disclosure.
Figure 4:
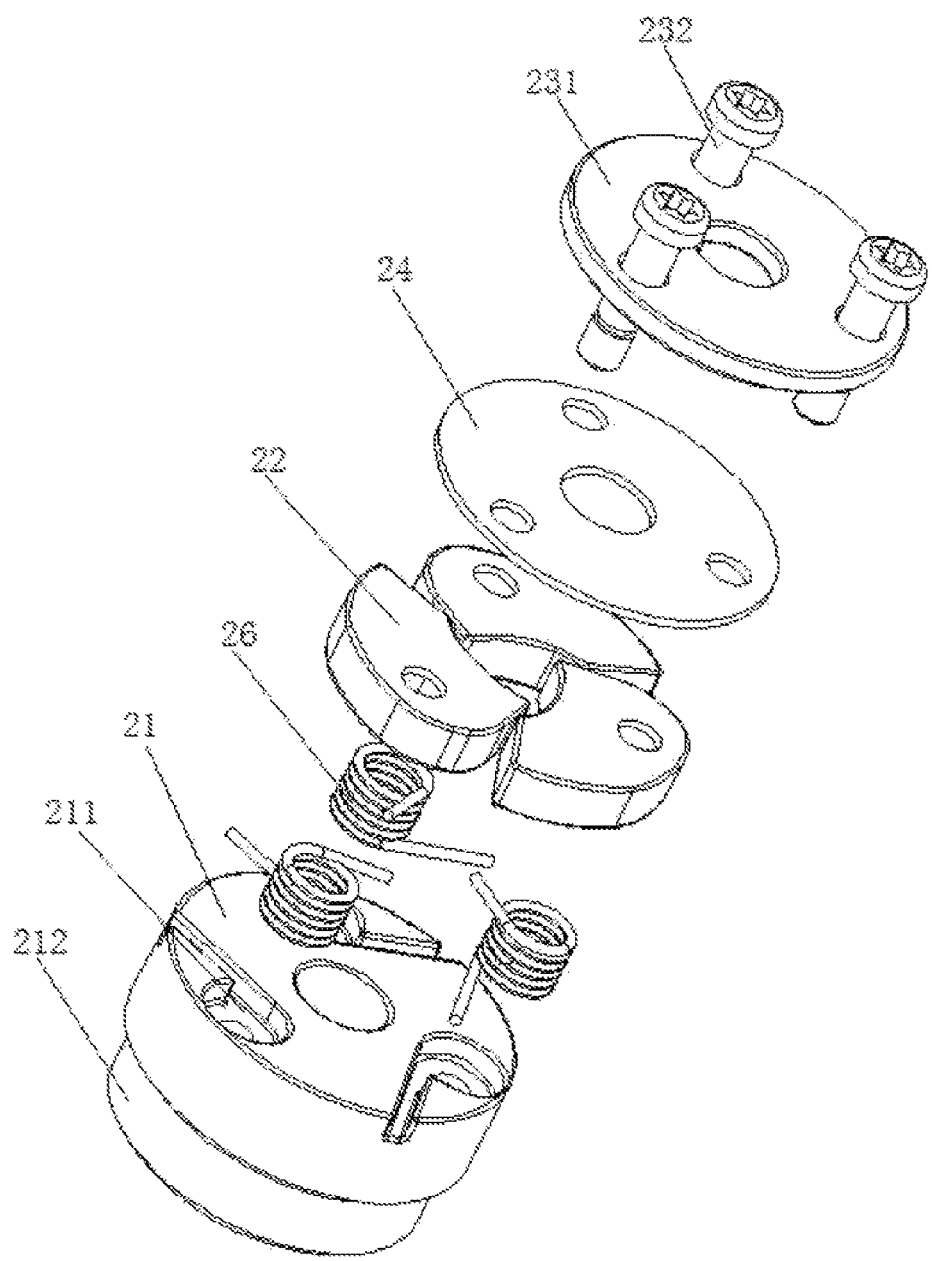
FIG. 4 schematically shows a second exploded view of the blade cam locking assembly of the disclosure.
Figure 5:
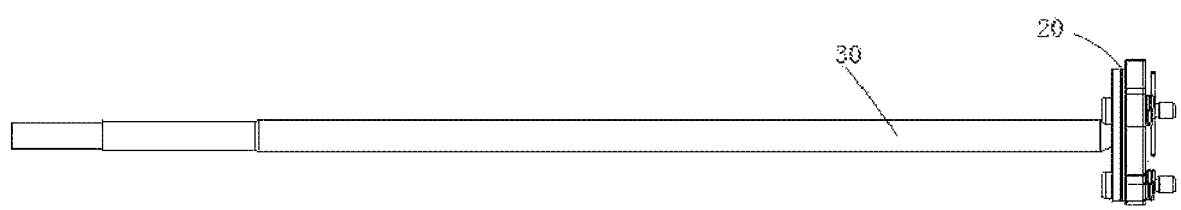
FIG. 5 schematically shows a front view of the unlocking structure of the disclosure at a locking state.
Figure 6:
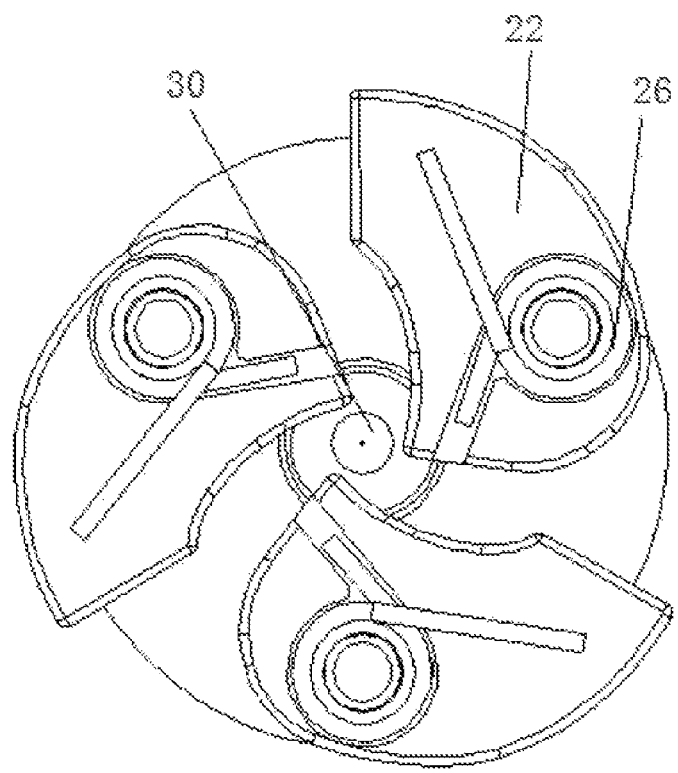
FIG. 6 schematically shows a right view of FIG. 5.
Figure 7:
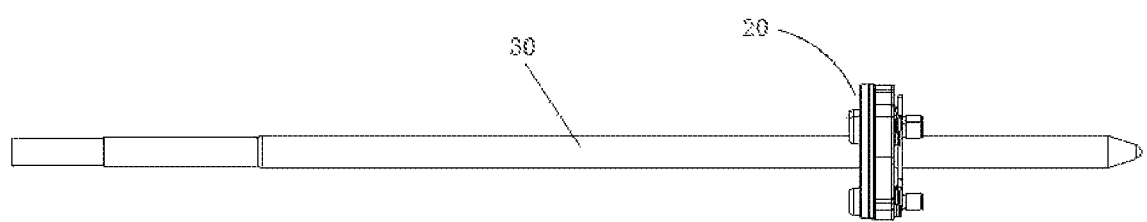
FIG. 7 schematically shows a front view of the unlocking structure of the disclosure at an unlocking state.
Figure 8:
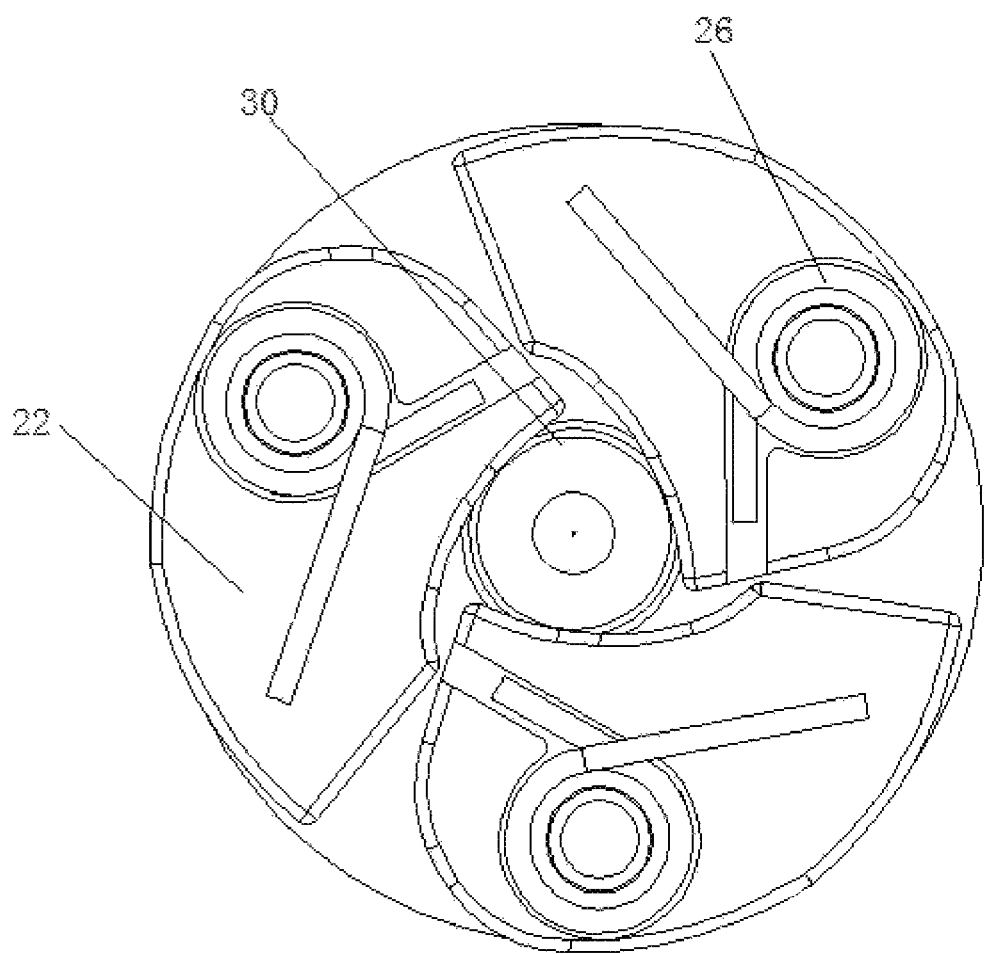
FIG. 8 schematically shows a right view of FIG. 7.

As shown in FIG. 3 and FIG. 4, in the embodiment, the blade cam locking assembly 20 includes a socket sleeve 21, a plurality of blade cam blocks 22, a torsional spring 26 and a fixing mechanism 23.

The socket sleeve 21 is fixedly connected with the first end of the tube 10 on the inner side; the plurality of blade cam blocks 22 are arranged on the socket sleeve 21 in a same circumferential direction; the torsional spring 26 is mounted between the socket sleeve 21 and the blade cam blocks 22 to enable the plurality of blade cam blocks 22 to expand in a direction far away from a central axis of the socket sleeve 21; when the first end of the tube 10 on the inner side extends to a first end of the tube 10 on the outer side, the plurality of blade cam blocks 22 can be automatically clamped inside the locking groove 11 under an action of the torsional spring 26; the fixing mechanism 23 is used for fixing the blade cam blocks 22 on the socket sleeve 21.

When the tube 10 on the inner side is extended to the first end of the tube 10 on the outer side, the torsional spring 26 of the blade cam locking assembly 20 enables the plurality of blade cam blocks 22 to expand in a direction far away from the central axis of the socket sleeve 21, thus the blade cam blocks 22 are clamped inside the locking groove 11, so that the tube 10 on the inner side cannot be moved relative to the tube 10 on the outer side, and then the telescopic baton may be locked.

In an exemplary embodiment, the fixing mechanism 23 includes a positioning plate 231 and a screw shaft 232, the positioning plate 231 is mounted on a side, far away from the socket sleeve 21, of the plurality of blade cam blocks 22, the screw shaft 232 penetrates through the positioning plate 231 and the blade cam block 22 corresponding to the screw shaft 232 and is connected with the socket sleeve 21, thus the blade cam block 22 is fixed on the socket, sleeve 21, making it simple in structure and good in stability.

Of course, in other embodiments of the disclosure, the positioning plate 231 may be removed, the plurality of blade cam blocks 22 are directly fixed on the socket sleeve 21 by using the screw shafts 232 instead, and other variation modes within the concept of the disclosure shall fall within the scope of protection of the disclosure.

In the embodiment, due to arrangement of the positioning plate 231, the plurality of blade cam blocks 22 may be defined between the positioning plate 231 and the socket sleeve 21, and the plurality of blade cam blocks 22 may be prevented from deviation.

To ensure smooth movement of the plurality of blade cam blocks 22, the blade cam locking assembly 20 in the embodiment further includes a lubricating piece 24, the lubricating piece 24 is mounted between each of the plurality of blade cam blocks 22 and the positioning plate 231 so as to ensure that the plurality of blade cam blocks 22 are capable of moving freely between the socket sleeve 21 and the positioning plate 231. In an exemplary embodiment, the lubricating piece 24 is a copper piece, of course, in other embodiments, the lubricating piece 24 may be a gasket structure with smooth surface, and other variation modes within the concept of the disclosure shall fall within the scope of protection of the disclosure.

In an exemplary embodiment, the tube 10 is an aluminum tube, and an annular iron ring (not shown in the figure) is arranged inside the locking groove 11. Under an action of the annular iron ring, the inner end surface of the locking groove 11 may be prevented from abrasion or burr caused by high pressure impact of the blade cam block 22, so that the extension function of the baton may be protected.

In the embodiment, a first positioning hole 211 is formed in the socket sleeve 21, a second positioning hole 221 corresponding to the first positioning hole 211 is formed in each of the plurality of blade cam blocks 22, the torsional springs 26 is sleeved on the screw shaft 232, both ends of the torsional spring 26 are respectively positioned inside the first positioning hole 211 and the second positioning hole 221, and both extended ends of the torsional spring 26 are respectively abutted against the socket sleeve 21 and the blade cam block 22, thus an outward torsion force is exerted to the blade cam block 22 conveniently, and the plurality of blade cam blocks 22 expand in a direction far away from a central axis of the socket sleeve 21 and are locked inside the locking groove 11.

Referring to FIG. 1 to FIG. 8 again, in the embodiment, three blade cam blocks 22 are provided, and cam parts of the three blade cam blocks 22 are positioned in a middle of the socket sleeve 21, the unlocking structure 30 shifts the camp, parts to enable the three blade cam blocks 22 to withdraw in a direction close to the central axis of the socket sleeve 21, so as to unlock the blade cam locking assembly 20, when the blade cam blocks 22 withdraw in a direction close to the central axis of the socket sleeve 21, the tube 10 on the inner side may be withdrawn into the tube 10 on the outer side only by exerting a force to the tube 10 on the inner side.

In the embodiment, the unlocking structure 30 is a thimble, an avoidance hole 25 is formed in the blade cam locking assembly 20, and the thimble penetrates through the avoidance hole 25 to drive the three blade cam blocks 22 to withdraw inwards, making it simple in structure and convenient to realize.

In the embodiment, to conveniently control the unlocking structure 30, a switch button 40 for driving the unlocking structure 30 to move is arranged at an end part of a tube 10 on the outermost side of the plurality of tubes 10. The switch button 40 includes a return spring which is arranged at an end part of the tube 10 on the outer side and a button which is fixed with the thimble. By pressing the button, the thimble may be driven to penetrate through the avoidance hole 25 to drive the blade cam blocks 22 to withdraw inwards, and under the action of the return spring, the thimble may be conveniently returned, making it simple in structure and convenient to control.

In the embodiment, a stud section 212 is arranged on the socket sleeve 21, a threaded hole is formed in the first end of the tube 10 on the inner side, and under the cooperation of the stud section 212 and the threaded hole, the socket sleeve 21 may be conveniently fixed on the tube 10. Of course, in other embodiments of the disclosure, the socket sleeve 21 may also be fixed on the tube 10 by using other fastening parts such as a screw and a rivet, and other variation modes within the concept of the disclosure shall fall within the scope of protection of the disclosure.

In an exemplary embodiment, the number of the tubes 10 is three, and when the telescopic baton includes three tubes 10, the telescopic baton includes a first tube, a second tube and a third tube, wherein the second tube is sleeved on the third tube, the first, tube is sleeved on the second tube. Locking grooves 11 are formed in the inner walls of both the first tube and the second tube; the switch button 40 is arranged at a head of the first tube, a thimble is connected with the switch button 40; a group of blade cam locking assemblies 20 which may be rotated and extended are arranged at tail ends of the second tube and the third tube, and the blade cam block 22 may be accommodated inside the locking groove 11 when extending out. The torsional springs 26 is arranged inside the blade cam locking assembly 20, thus the blade cam block 22 always has an outward torsion force, so that the telescopic baton may be locked inside the locking groove 11 when extending out. The annular iron ring is arranged inside the locking groove 11, so that the inner end surface of the locking groove 11 may be prevented from abrasion or burr caused by high pressure impact of the blade cam block 22, and the extension function of the baton may be protected.

From the above description, it can be seen that the embodiments of the disclosure achieve technical effects as follows: due to adoption of the blade cam locking assembly, the telescopic baton of the disclosure is not liable to withdraw after being extended and locked, in addition, it is smooth to operate in the extension process, and is convenient to unlock.

The above is only the preferable embodiments of the disclosure, and not intended to limit the disclosure. As will occur to a person skilled in the art, the disclosure is susceptible to various modifications and changes. Any modifications, equivalent replacements, improvements and the like made within the spirit and principle of the disclosure shall fall within the scope of protection of the disclosure.

What is claimed is:

1. A telescopic baton, comprising:
a plurality of tubes sequentially arranged in an embedded manner, wherein a tube on an inner side of two adjacent tubes in the plurality of tubes is capable of extending and withdrawing along an axis direction of a tube on an outer side of the two adjacent tubes, and a locking groove is formed in an inner wall of a first end of the tube on the outer side;
a blade cam locking assembly comprising a socket sleeve, a plurality of blade cam blocks, a torsional spring and a fixing mechanism, wherein the socket sleeve is fixedly coupled to a first end of the tube on the inner side; the plurality of blade cam blocks are provided on the socket sleeve in a same circumferential direction; both extended ends of the torsional spring are respectively abutted against the socket sleeve and the plurality of blade cam blocks so as to enable the plurality of blade cam blocks to extend in a direction far away from a central axis of the socket sleeve, when the first end of the tube on the inner side extends to the first end of the tube on the outer side, the plurality of blade cam blocks are automatically clamped inside the locking groove under an action of the torsional spring; and an unlocking structure, wherein the unlocking structure is fixedly mounted inside a tube on an outermost side of the plurality of tubes, and the unlocking structure is used for driving the plurality of blade cam blocks to withdraw in a direction close to the central axis of the socket sleeve under an action of an external force so as to unlock the blade cam locking assembly.

2. The telescopic baton as claimed in claim 1, wherein the fixing mechanism comprises:

a positioning plate, wherein the positioning plate is mounted on a side, far away from the socket sleeve, of the plurality of blade cam blocks; and a screw shaft, wherein the screw shaft penetrates through the positioning plate and a corresponding blade cam block in the plurality of blade cam blocks and is coupled to the socket sleeve.

3. The telescopic baton as claimed in claim 2, wherein the blade cam locking assembly further comprises a lubricating piece, and the lubricating piece is mounted between each of the plurality of blade cam blocks and the positioning plate.

4. The telescopic baton as claimed in claim 1, wherein the telescopic baton further comprises an annular iron ring arranged inside the locking groove.

5. The telescopic baton as claimed in claim 2, wherein a first positioning hole is formed in the socket sleeve, a second positioning hole corresponding to the first, positioning hole is formed in each of the plurality of blade cam blocks, the torsional spring is sleeved on the screw shaft, and both ends of the torsional spring are respectively located inside the first positioning hole and the second positioning hole.

6. The telescopic baton as claimed in claim 1, wherein a stud section is arranged on the socket sleeve, and a threaded hole is formed in the first end of the tube on the inner side.

7. The telescopic baton as claimed in claim 1, wherein there are three blade cam blocks, cam parts of the three blade cam blocks are located in a middle of the socket sleeve, and the unlocking structure shifts the cam parts to enable the three blade cam blocks to withdraw in the direction close to the central axis of the socket sleeve so as to unlock the blade cam locking assembly.

8. The telescopic baton as claimed in claim 7, wherein the unlocking structure is a thimble, an avoidance hole is formed in the blade cam locking assembly, and the thimble penetrates through the avoidance hole to drive the three blade cam blocks to withdraw in the direction close to the central axis of the socket sleeve.

9. The telescopic baton as claimed in claim 1, wherein a switch button for driving the unlocking structure to move is arranged at an end part of the tube on the outermost side of the plurality of tubes.

10. The telescopic baton as claimed in claim 2, wherein a switch button for driving the unlocking structure to move is arranged at an end part of the tube on the outermost side of the plurality of tubes.

11. The telescopic baton as claimed in claim 3, wherein a switch button for driving the unlocking structure to move is arranged at an end part of the tube on the outermost side of the plurality of tubes.

12. The telescopic baton as claimed in claim 4, wherein a switch button for driving the unlocking structure to move is arranged at an end part of the tube on the outermost side of the plurality of tubes.

13. The telescopic baton as claimed in claim 5, wherein a switch button for driving the unlocking structure to move is arranged at an end part of the tube on the outermost side of the plurality of tubes.

14. The telescopic baton as claimed in claim 6, wherein a switch button for driving the unlocking structure to move is arranged at an end part of the tube on the outermost side of the plurality of tubes.

15. The telescopic baton as claimed in claim 7, wherein a switch button for driving the unlocking structure to move is arranged at an end part of the tube on the outermost side of the plurality of tubes.

16. The telescopic baton as claimed in claim 8, wherein a switch, button for driving the unlocking structure to move is arranged at an end part of the tube on the outermost side of the plurality of tubes.

\* \* \* \* \*